US008827348B2

(12) United States Patent
Oyen

(10) Patent No.: US 8,827,348 B2
(45) Date of Patent: Sep. 9, 2014

(54) SELF LOCKING AND UNLOCKING HINGE

(71) Applicant: Deere & Company, Moline, IL (US)

(72) Inventor: Trisha L. Oyen, Hazel Green, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/763,079

(22) Filed: Feb. 8, 2013

(65) Prior Publication Data

US 2014/0225394 A1 Aug. 14, 2014

(51) Int. Cl.
*B60J 5/00* (2006.01)
*E05D 11/10* (2006.01)

(52) U.S. Cl.
CPC .................................. *E05D 11/1085* (2013.01)
USPC ..................................................... 296/146.11

(58) Field of Classification Search
CPC ... E05D 7/1005; E05D 11/1085; E05D 5/062; E05Y 2900/51
USPC ................. 16/321, 343, 345, 352, 353; 292/1
See application file for complete search history.

(56) References Cited

U.S. PATENT DOCUMENTS

| | | | | | |
|---|---|---|---|---|---|
| 3,905,065 | A * | 9/1975 | Seeger et al. | ................... | 16/317 |
| 4,501,045 | A * | 2/1985 | Boyer | ............................. | 16/331 |
| 5,104,161 | A * | 4/1992 | Kautt | ............................ | 292/157 |
| 5,761,768 | A * | 6/1998 | Wolf et al. | ....................... | 16/225 |
| 7,784,155 | B2 * | 8/2010 | Hoffman | .......................... | 16/367 |
| 8,556,330 | B2 * | 10/2013 | Lazarevich et al. | ...... | 296/146.11 |
| 2009/0058131 | A1 * | 3/2009 | Smith et al. | .............. | 296/146.11 |
| 2009/0282645 | A1 * | 11/2009 | Lee | ................................. | 16/248 |
| 2010/0218342 | A1 * | 9/2010 | Bertolini et al. | ................ | 16/244 |
| 2013/0180177 | A1 * | 7/2013 | Lazarevich et al. | ............. | 49/399 |

* cited by examiner

*Primary Examiner* — Pinel Romain

(57) ABSTRACT

A self locking hinge is disclosed which can index a door to multiple open positions and hold it in place. The door may be closed by opening it completely and then returning it to the closed position or by lifting the door to clear a portion of a locking mechanism and simultaneously closing it.

12 Claims, 10 Drawing Sheets

SELF LOCKING AND UNLOCKING HINGE

FIELD OF THE DISCLOSURE

This disclosure relates to a hinge for a door and, more specifically, to a self locking and unlocking hinge for a door.

BACKGROUND OF THE DISCLOSURE

The operating mechanisms for doors having multiple locked open positions tend to be either complex or space consuming. Space may be costly and complexity may be a drawback when such doors are located on work vehicles.

SUMMARY OF THE DISCLOSURE

The challenges described above are overcome via the use of a self locking hinge having one or more brackets and a spring loaded pin.

DESCRIPTION OF THE PREFERRED EMBODIMENT

Figure 1:
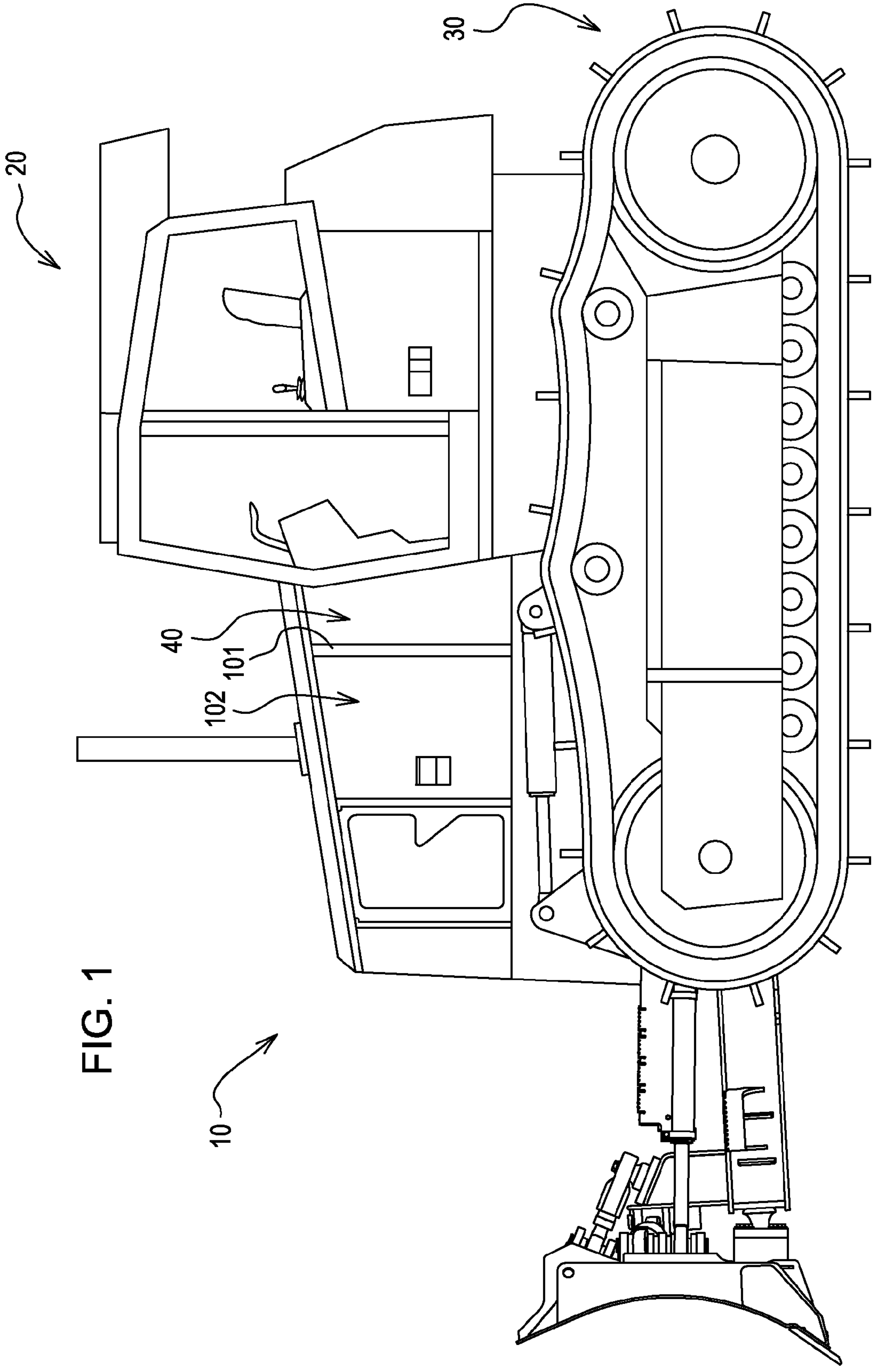
FIG. 1 illustrates a vehicle which may use the invention.

FIG. 1 illustrates a vehicle in which an exemplary embodiment of the invention may be used. This particular vehicle, i.e., a dozer 10, includes a cab 20, tracks 30 through which the dozer 10 may be propelled, a frame 40, a door frame 101 and a door 102 which, in this particular example, opens in a side direction. In other words the door 102 is hinged on one of its sides 102', 102" and may open from side 102' to the side 102" or vice versa. In this exemplary embodiment, the door opens from side 102' to side 102", i.e., the door 102 is hinged on side 102".

Figure 2:
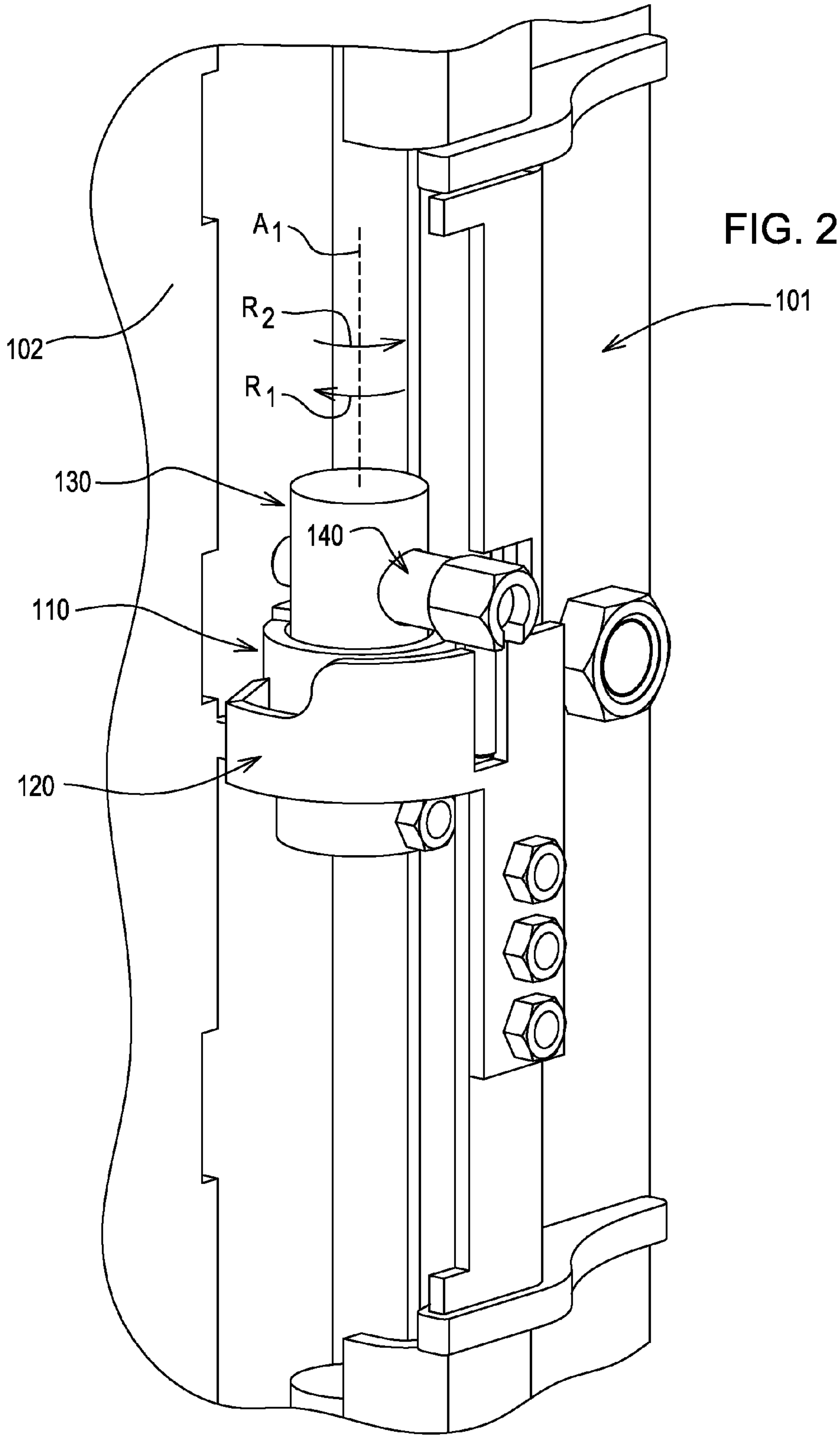
FIG. 2 illustrates an exemplary embodiment of the invention when the door is closed.

FIG. 2 illustrates an exemplary embodiment of the invention, i.e., the self locking hinge 100 when the door 102 is closed. As illustrated, the hinge 100 includes a door frame 101 which may be rigidly connected to the frame 40; a first bracket 110 which may be rigidly connected to a second bracket 120 via nut and bolt (the second bracket 120 may be rigidly connected to the door frame 101 via conventional nuts and bolts); a third bracket 130 which may be rigidly connected to the door 102 and a pin assembly 140 which may be operably connected to the door 102 via a rigid connection with the third bracket 130. The terms "rigid" and "rigidly" as used in this description are employed to denote a connection which allows zero degrees (0°) of relative movement between the connected parts. Accordingly, as the door 102 rotates toward open and closed positions indicated by arrows R1 and R2, respectively, the third bracket 130 and pin assembly 140 may rotate about an axis of rotation A1 for the door as a portion of the hinge 100.

Figure 3A:
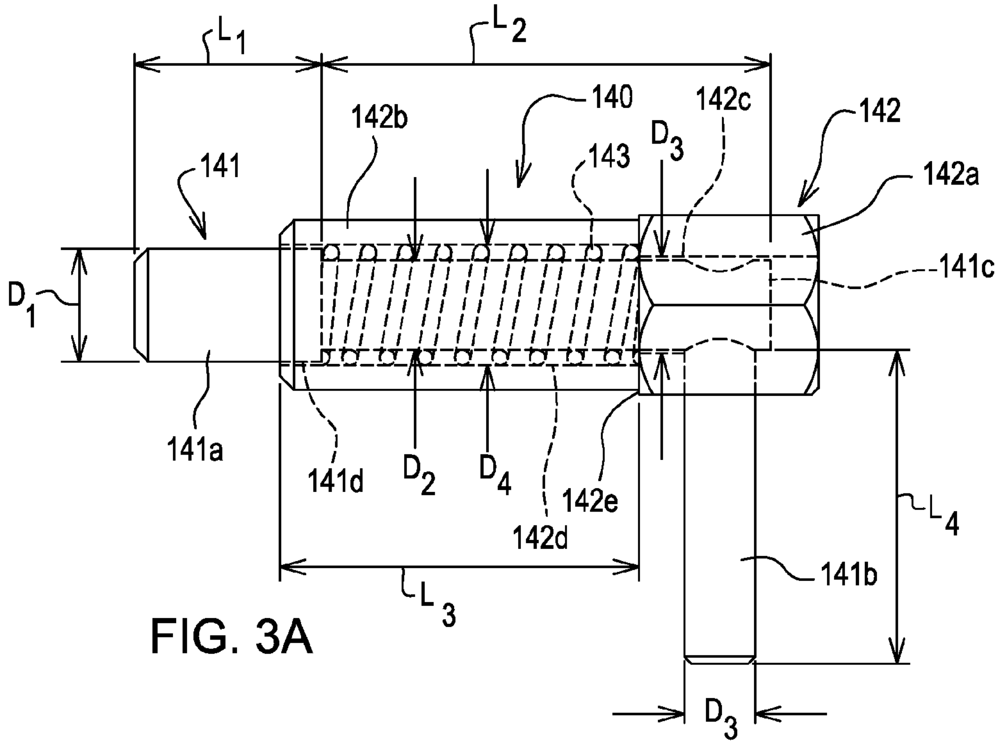
FIG. 3A illustrates an exemplary embodiment of the pin assembly with the pin in the lock position.
Figure 3B:
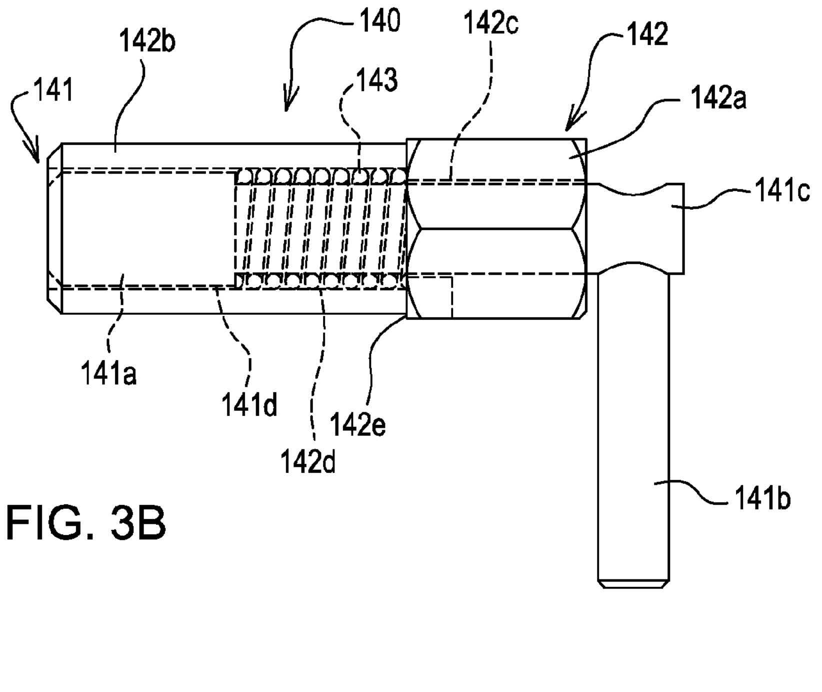
FIG. 3B illustrates an exemplary embodiment of the pin assembly illustrated in FIG. 3A with the pin in the unlocked position.

As illustrated in FIGS. 3*a* and 3*b*, the pin assembly 140 may include a pin 141; a pin holder 142; and a spring 143. The pin 141 includes a locking portion 141*a* having a diameter of D1; an unlocking portion 141*b* having a diameter of D3; and a connecting portion 141*c* having a diameter of D2 smaller than, and concentric with diameter D1. As illustrated, the size difference in diameters D1 and D2 may be sufficient to form a first wall 141*d* against which the spring 143 may abut. The pin holder 142 includes a first pin holder portion 142*a* and a second pin holder portion 142*b* each having first and second cylindrical holes 142*c*, 142*d* which may be concentric. The diameters of cylindrical holes 142*c*, 142*d* are D3 and a larger D4, respectively. As illustrated, the size difference in diameters D3 and D4 is sufficient to form a second wall 142*e* against which the spring 143 may abut. As illustrated, the diameter D5 of the spring 143 is sufficient to fit over the connecting portion 141*c* and abut first and second walls 142*e* and 141*d*, yet small enough to fit within the second cylindrical hole 142*d*. The second pin holder portion 142*b* may have an outer diameter D4' that is smaller than an outer diameter D3' of the first pin holder portion 142*a*.

The pin assembly 140 illustrated in FIG. 3*a* has the pin 141 in the lock position, i.e., the locking portion 141*a* is protruding from the pin holder 142 and the connecting portion 141*c* is retracted into the pin holder 142. As illustrated, in this position, the spring 143 is extended. FIG. 3*b* illustrates the pin assembly 140 with the pin in the unlock position, i.e., the locking portion 141*a* is retracted into the pin holder 142 and the connecting portion 141*c* is now protruding from the pin holder 142. As illustrated in FIGS. 3*a* and 3*b*, the spring 143 may be compressive, biasing the pin 141 to the lock position. In this exemplary embodiment the spring 143 may be compressed, exerting a greater compressive force to return the pin 141 to the lock position than the compressive force it exerts when the pin 141 is in the lock position.

Figure 4:
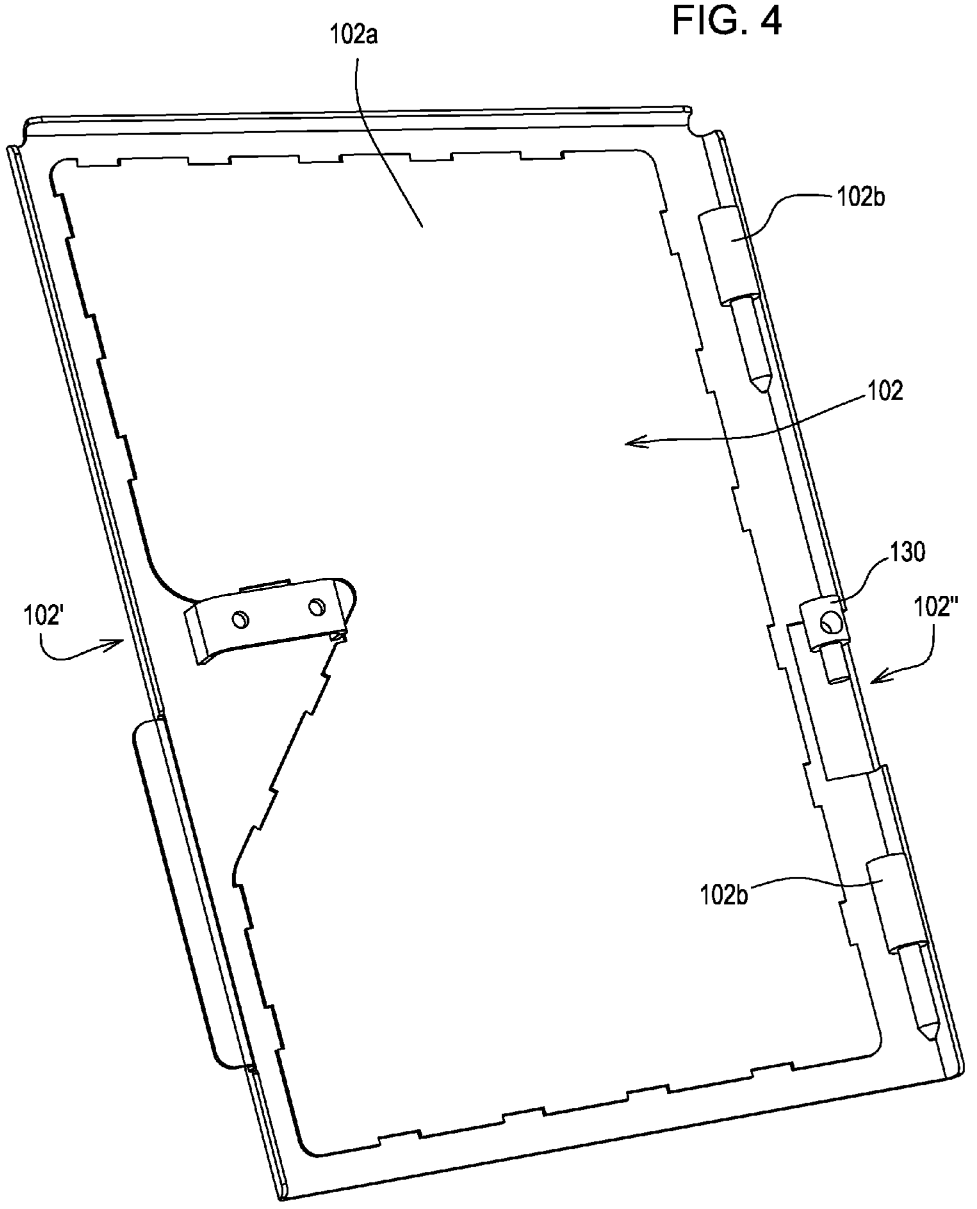
FIG. 4 is a view of an exemplary embodiment of the door weldment.

FIG. 4 illustrates an exemplary embodiment of the door 102 which may be a weldment including: a wall 102*a*; the third bracket 130; and conventional hinge pins 102*b*.

Figure 5:
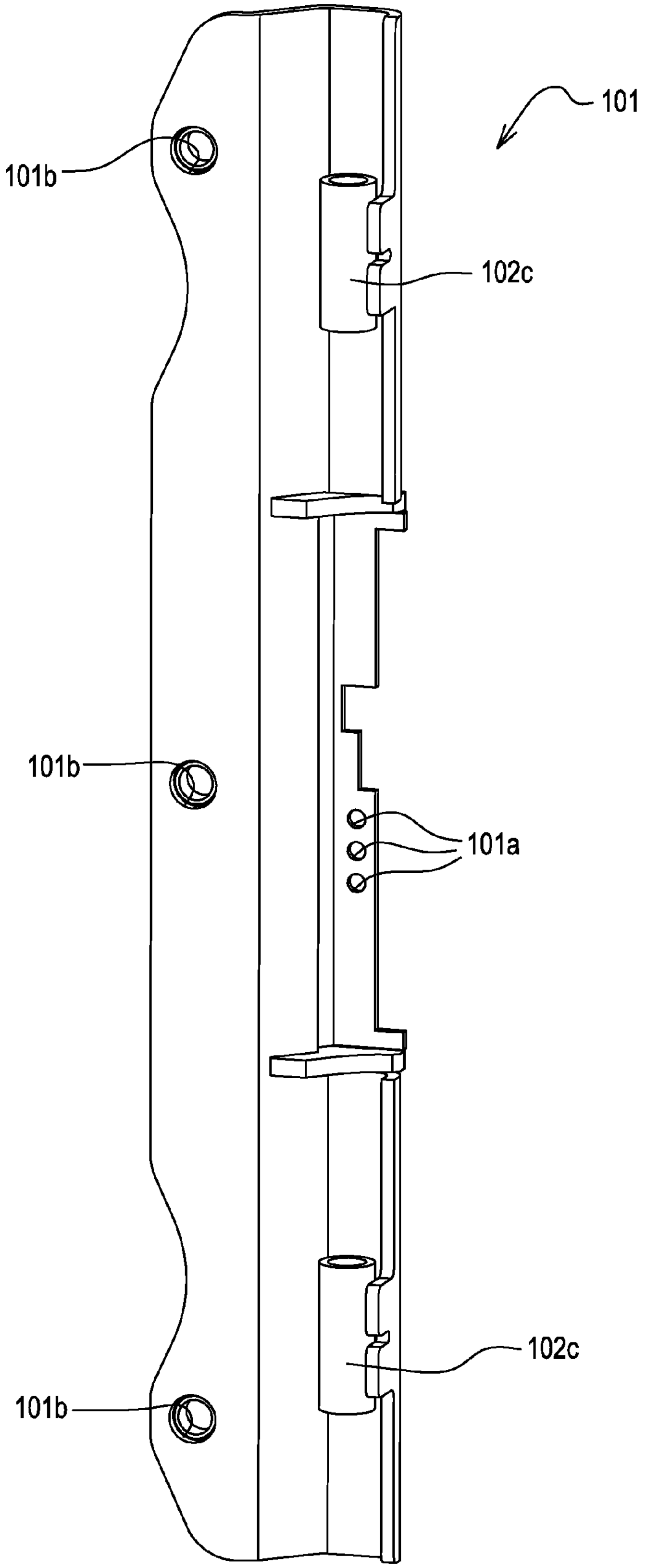
FIG. 5 is an exemplary embodiment of the door frame.

FIG. 5 illustrates an exemplary embodiment of the door frame 101 including first bracket attachment holes 101*a*, frame attachment holes 101*b* and conventional cylinders 102*c* for conventional connections with the hinge pins 102*b* of the door.

Figure 6A:
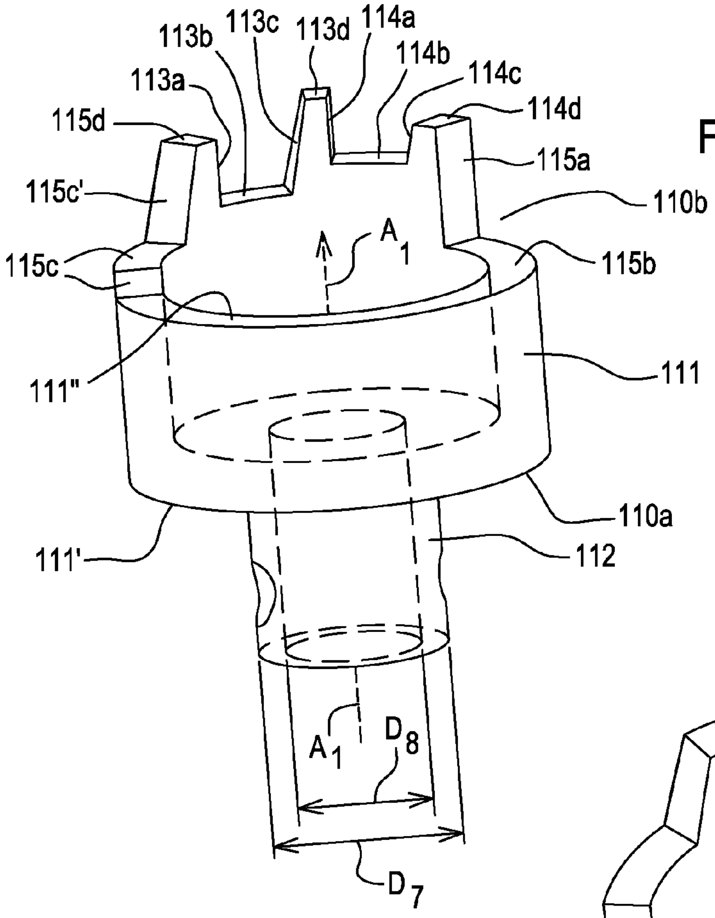
FIG. 6A is a perspective view of an exemplary embodiment of the first bracket.
Figure 6B:
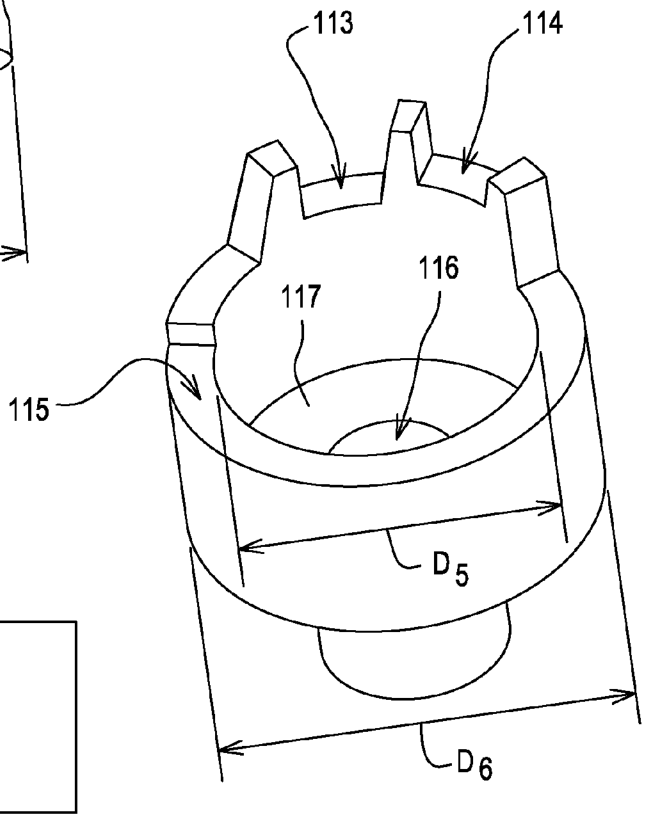
FIG. 6B illustrates another view of the exemplary embodiment of the first bracket of FIG. 6A.
Figure 6C:
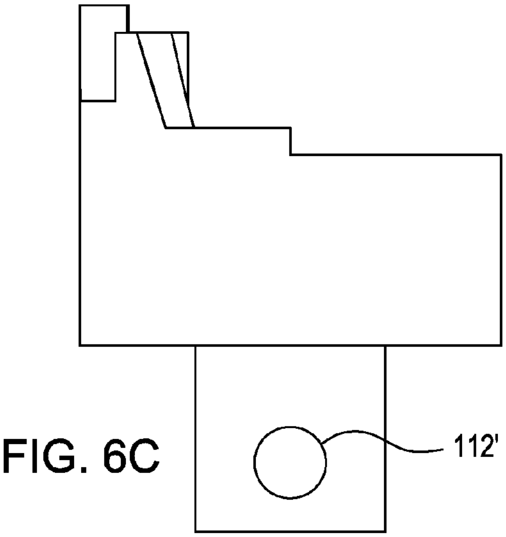
FIG. 6C illustrates another view of the exemplary embodiment of FIG. 6A.

FIGS. 6A-6C are detailed perspective views of the first bracket 110. As illustrated, the first bracket 110 may have a cylindrical locking portion 111, having inner and outer locking diameters D5, D6, and a cylindrical mounting portion 112, having inner and outer mounting diameters D7, D8. The cylindrical locking portion 111 may have first and second end surfaces 111' and 111" at first and second ends 110*a*, 110*b*, respectively. Two locking grooves, i.e., a first locking groove 113 and a second locking groove 114 may be located on the second end surface 111". Additionally, a free rotation area 115, which may be considered an enlarged groove, is also located on the second end surface 111".

As illustrated, the first locking groove 113 may include a first blocking surface 113*a*, a first resting surface 113*b* which may be adjacent and generally orthogonal to the first blocking surface 113*a*, and a first ramp surface 113*c* which may be adjacent to the first resting surface 113*b*. The first locking groove 113 may have a length L1 sufficient to contain the locking portion 141*a* (of diameter D1) of the pin 141 between the first blocking surface 113*a* and the first ramp surface 113*c* and allow the surface of the locking portion 141*a* to touch the resting surface 113*b*. The first locking groove 113 may also include a first transitional plateau surface 113*d*.

Similarly, the second locking groove 114 may include a second blocking surface 114*a*, a second resting surface 114*b* adjacent and generally orthogonal to the second blocking surface 114*a*, and a second ramp surface 114*c* which may be adjacent to the second resting surface 114*b*. The second locking groove 114 may have a length L2 sufficient to contain the locking portion 141*a* (of diameter D1) of the pin 141 between the second locking surface 114*a* and the second ramp surface 114*c* and allow a surface of the locking portion 141*a* to touch the second resting surface 114*b*. L2 may be equal to L1. The second locking groove 114 may also include a second transitional plateau surface 114*d*.

The free rotation area 115 may include a third blocking surface 115*a*, a third resting surface 115*b* adjacent to the third blocking surface 115*a*, and a step surface 115*c*. The third bracket 130 and attached pin assembly 140 may rotate freely when the locking portion 141*a* is between the blocking surface 115*a* and the step surface 115*c*, i.e., when the locking portion 141*a* is in the free rotation area 115. A third ramp surface 115*c'* may be included adjacent the step surface 115*c*. A third transitional plateau surface 115*d* may also be included adjacent the third ramp surface 115*c'*.

As illustrated, the first, second and third ramp surfaces 113*c*, 114*c*, 115*c'* may be shaped, i.e., angled, so as to ease a movement of the locking portion 141*a* to the second locking groove 114, the free rotation area 115 and the first locking groove 113, respectively. However, the purpose of these surfaces may be dual and include: (1) transitioning the pin assembly 140 from one locked state to another; and (2) resisting a movement of the locking portion 141*a* from the locking grooves 113, 114 and the free rotation area 115 in the first direction. As such, these surfaces may have alternative shapes. The first, second and third ramp surfaces 113*c*, 114*c*, 115*c'* may be angled or shaped such that a desired turning torque is necessary to transition the door 41 from one locking state to another. As illustrated in FIGS. 6A and 6C, first bracket mounting holes 112' of diameter D9 may be located on opposite sides of the cylindrical mounting portion 112 and aligned with each other.

Figure 8A:
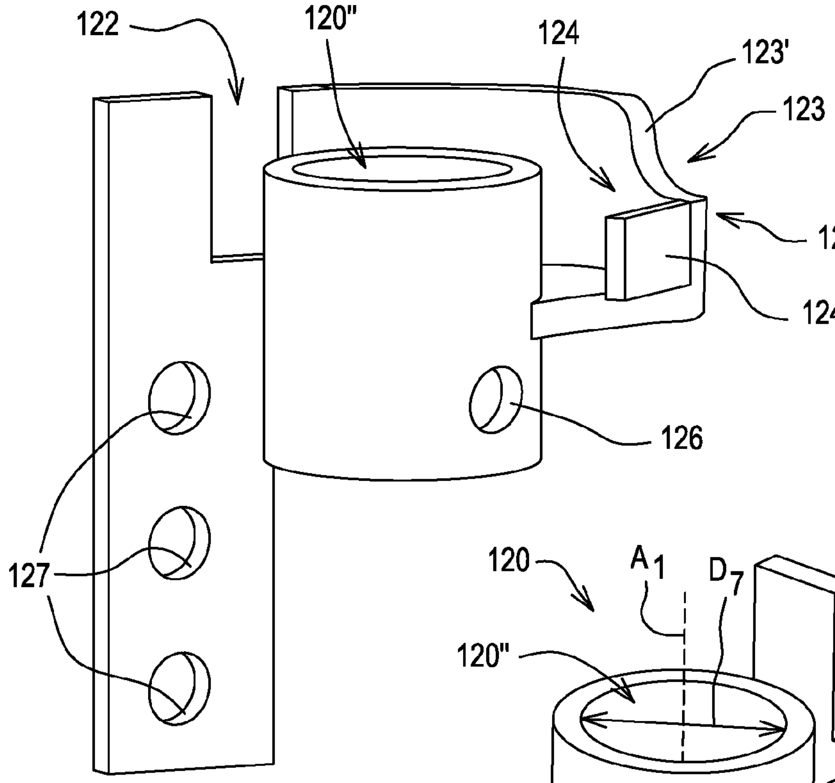
FIG. 8A is a detailed perspective view of an exemplary embodiment of the second bracket.
Figure 8B:
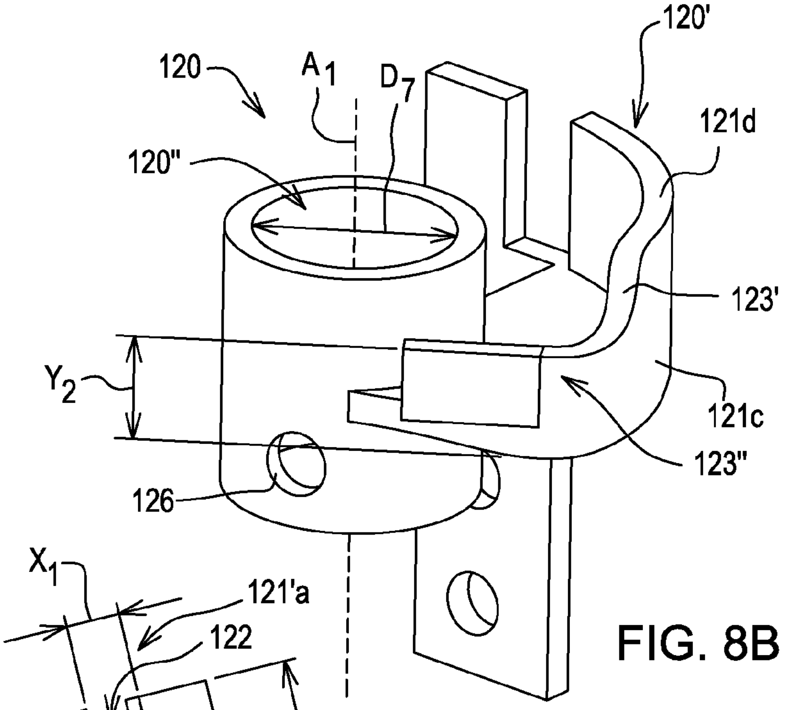
FIG. 8B is a second detailed perspective view of the embodiment of FIG. 8A.
Figure 8C:
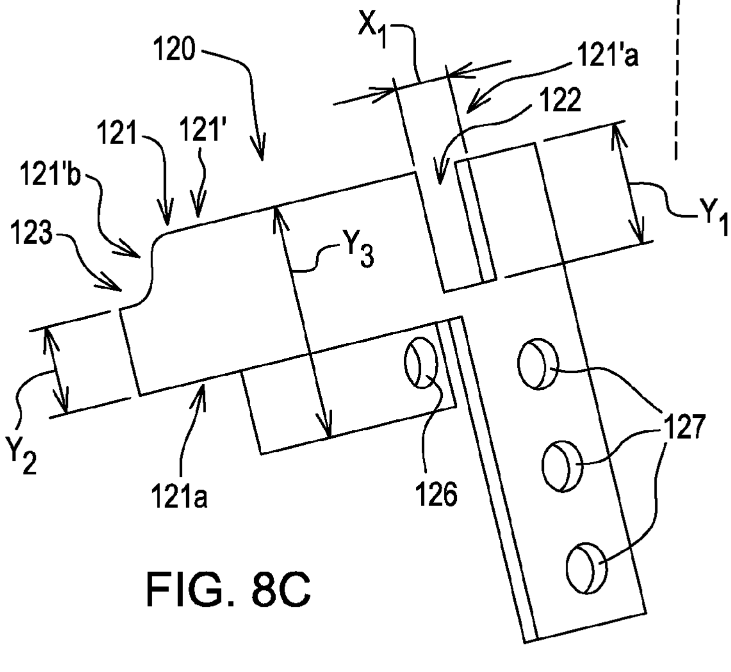
FIG. 8C is a third detailed perspective view of the embodiment of FIG. 8A; when the door has been moved beyond the second locked position and the hinge is unlocked and set to return to the closed door position.
Figure 9A:
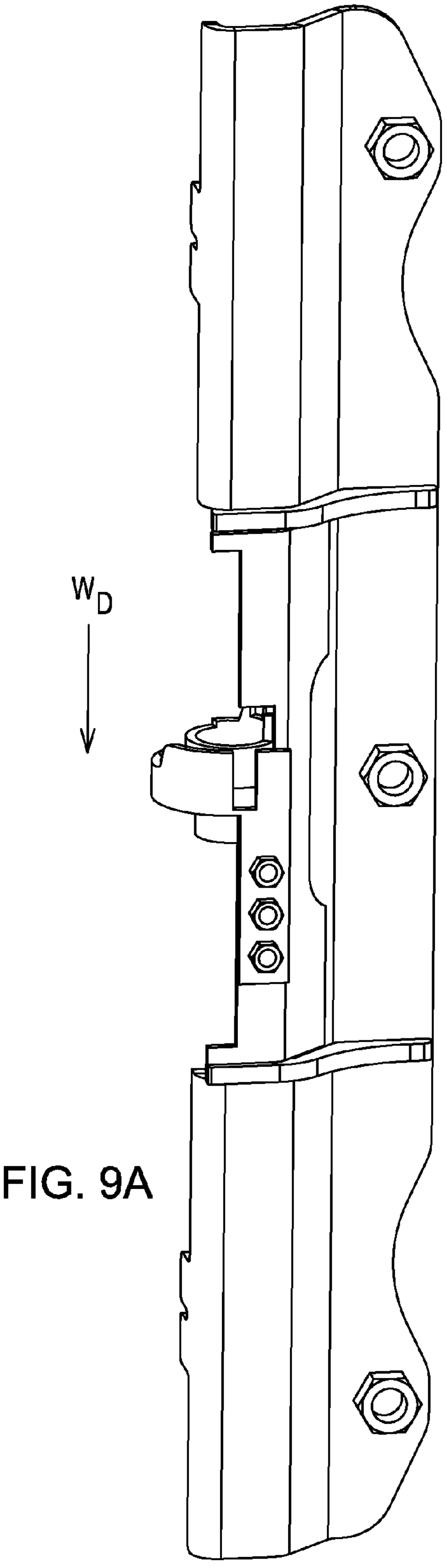
FIG. 9A is a perspective view of an exemplary embodiment of the door frame with the first and second brackets attached.
Figure 9B:
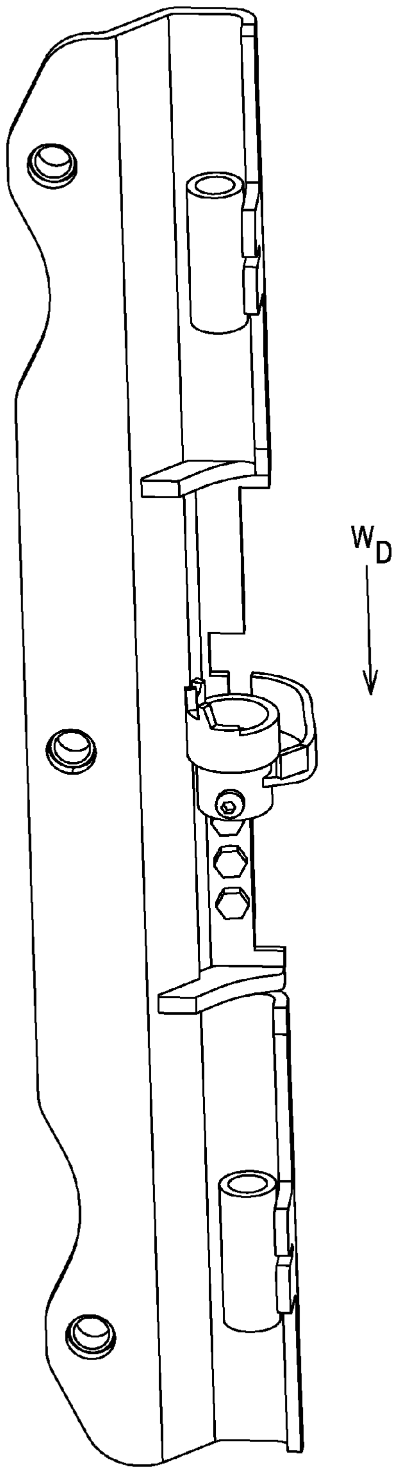
FIG. 9B is a second detailed perspective view of the embodiment of FIG. 9A.

FIGS. 8A-8C illustrate detailed perspective views of the second bracket 120. As illustrated, the second bracket 120 may be formed such that it includes an outer portion 120' and an inner portion 120". As illustrated, the outer portion 120' may be arcuate in a first section 121 and flat in a second section 122. The first section 121 includes a first end 121*a*; a second end 121*b*; an axis $A_{b2}$ aligned with $A_{b1}$; and an inner radius $R_{b2}$ equal to or greater than an outer radius $R_{b1}$ of the first bracket 110, where $R_{b1}$ is calculated as $D_6/2$. As illustrated, the first section 121 may include an arcuate tab 121' on the second end 121*b* formed by a slot 122*a* on a first side 121*a* of the arcuate tab 121' and a transitional relief 123 on a second side 121*b* of the arcuate tab 121'. The transitional relief 123 may include a transition surface 123' in the general shape of an "S" as illustrated. The slot 122*a* may have a width of X1 and a depth of Y1 and the transitional relief 123 may have a depth of Y2 which is smaller than Y1. The slot 122*a* may be formed in the flat section 122 which may be in a tangential relationship with the arcuate first section 121 as illustrated. The flat section 122 may include holes 127 to be aligned with holes 101*a* for attachment to the door frame 101 via conventional methods such as nuts and bolts as illustrated in FIGS. 9 and 10.

As illustrated, integral to the transitional relief 123 may be an unlocking ramp 124 in the form of a straight tab having a ramp outer surface 124' in a positional relationship with the transitional relief 123 such that points on the tab that are farther away from an edge of the transitional relief 123" may be closer to the inner portion 120" than points closer to the edge of the transitional relief 123". The unlocking ramp 124 may be situated such that, while the locking pin assembly is in the locking position, the unlocking portion 141*b* of the locking pin assembly 140 is capable of contacting or engaging the ramp outer surface 124' as the locking portion 141*a* falls to contact the third resting surface 115*b* of the first bracket 110 and the locking pin assembly 140 falls to its lowest height. As previously mentioned, and illustrated in FIGS. 8A-8C, the second bracket 120 may also include a cylindrical inner portion 120" having a cylindrical outer radius $R_{b3}$ less than $R_{b2}$ and an inner diameter $D_7$ equal to or greater than an outer diameter of the first bracket $D_6$ as well as aligned second bracket through holes 126 on opposite sides of the inner cylindrical portion 120". Ideally, D7 and D6 are designed for the respective parts to fit together snugly. As illustrated in FIG. 2, the first bracket 110 is assembled to the second bracket 120 by fitting the first bracket 110 and the second bracket 120 together as shown, aligning the aligned first bracket through holes 112' with the aligned second bracket through holes 126 and using a conventional nut and bolt arrangement to secure the first bracket 110 to the second bracket 120 via the aligned first and second bracket through holes 112' and 126.

Figure 10:
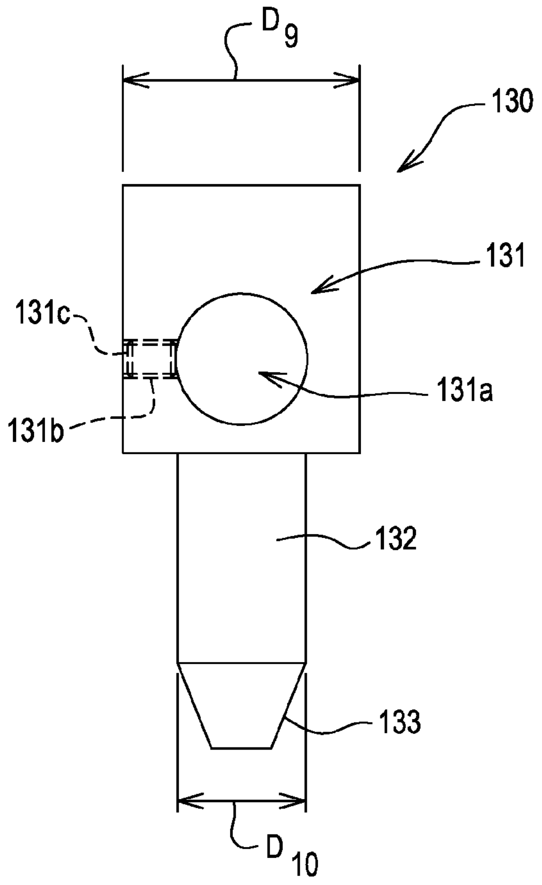
FIG. 10 is a detailed perspective vie of an exemplary embodiment of the third bracket.

FIG. 10 presents an exemplary perspective view of the third bracket 130. As illustrated the third bracket 130 may include a first cylindrical portion 131 having a first portion diameter D9 and a pin mounting hole 131*a* therethrough for mounting the pin assembly 140, a second cylindrical portion 132 having a second portion diameter D10 which is smaller than the first portion diameter D9 and a cone portion 133 for ease of assembly and operation. As illustrated, the first cylindrical portion 131 may may also include a threaded set screw hole 131*b* and a set screw 131*c* (or some other conventional arrangement) for rigidly mounting the pin assembly 140, i.e., attaching the pin assembly 140 to the first cylindrical portion 131 with zero (0) degrees of freedom for relative movement between the pin assembly 140 and the third bracket 130. The third bracket 130 may be appropriately oriented and welded to the door 102 along the surface of the first cylindrical portion 131 or rigidly attached to the door 102 via some other conventional means (see FIG. 7).

As described earlier, the first bracket 110 and the second bracket 120 may be arranged to have zero degrees (0°) of freedom for relative movement between these brackets, the door frame and, thus, the frame 40 as the first bracket 110 may be rigidly attached to the door frame 101 via conventional methods such as screws and the second bracket 120 may be rigidly attached to the first bracket 110 via conventional methods. The third bracket 130 and the locking pin assembly 140 may be arranged to have zero degrees (0°) of freedom for movement between these parts and the door 102 where the third bracket 130 may be rigidly attached to the door 102 and the locking pin assembly 140 may be rigidly attached to the third bracket 130 via the pin mounting hole 131*a* and the set screw 131*c*.

In operation, the first bracket 110, the second bracket 120, the third bracket 130 and the pin assembly 140 may be arranged such that, as the door 102 rotates in a first direction (e.g., an opening direction), the locking portion 141*a* may contact ramp surfaces 115*c* and 113*c* and, respectively, engage first and second locking grooves 113, 114 in that order. Ramp surfaces 115*c* and 113*c* aid in engagement of the first and second locking grooves 113, 114 by providing a more gradual transition to resting surfaces 113*b*, 114*b*, respectively, and transitional plateau surfaces 115*d* and 113*d* smoothen the engagements by, respectively, providing buffer zones, while blocking surfaces 113*a*, 114*a* tend to prevent rotation of the door 102 in a second direction (e.g., in a closing direction). As illustrated, the second end surface 111" of the first bracket 110 may support the weight of the door 102 (see $W_d$). Thus the weight of the door 102 may tend to cause the locking hinge 100 to resist movement along any of the ramp surfaces 113*c*, 115*c*, 114*c* in the first direction and to prevent movement past the blocking surfaces 113*a*, 114*a*, 115*a* in the second direction, urging the door 102 to remain in the first or second groove 113, 114 via action $W_D$ against the corresponding first or second resting surfaces 113*b*, 114*b* and, thus, holding or locking the door 102 in place when the locking portion 141*a* enters either of the locking grooves 113, 114.

Figure 7:
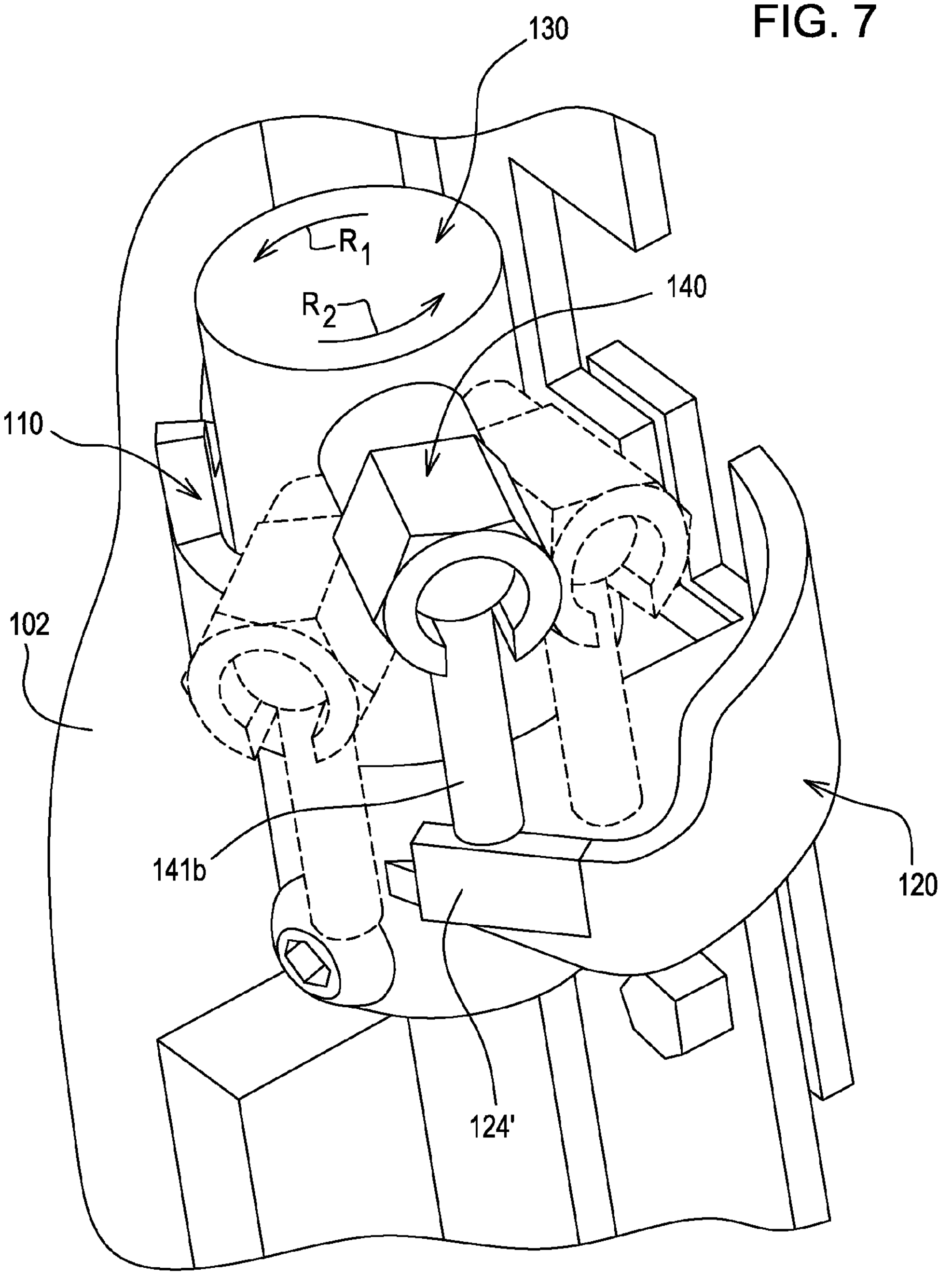
FIG. 7 illustrates three positions of the unlocking portion as the door becomes completely open.

As illustrated in FIG. 7, as the door 102 rotates from the first locking groove 113 to the second locking grove 114 the door 102 may be lifted against $W_d$ as points along second ramp 113*c* may be higher than points on the first resting surface 113*b* and the second resting surface 114*b* may be at a higher level than the first resting surface 113*b*. As illustrated, as the locking portion 141*a* leaves the second locking groove 114 and rises along the ramp surface 114*c*, the door 102 and the pin assembly 140 may reach their highest point along the first bracket 110 and the unlocking portion 141*b* may rise to a height greater than that of the unlocking ramp 124. As the locking portion 141*a* reaches the end of the second ramp surface 114*c*, the unlocking portion may be located at a radius greater than that of a contact surface 124*b* on the unlocking ramp 124 as well as at a higher location than the unlocking ramp 124. Once the locking portion 141*a* clears the ramp surface 114*c* and the plateau surface 114*d*, and as the door 102 continues to turn in the first direction, the locking portion 141*a* falls to the level of the third resting surface 115*b* and the height of the unlocking portion 141*b* falls such that the unlocking portion 141*b* may contact or engage the contact surface 124*b*. As the door 102 then rotates in a second direction, the unlocking portion 141*b* slides along the contact surface 124*b* resulting in an increasing distance of the unlocking portion from the axis A1 and, thereby, withdrawing the locking portion 141*a* from contact with the second end surface 111". Once the unlocking portion 141*b* is in contact with the contact surface 121*c* of the arcuate portion 121, the locking portion 141*a* may be completely withdrawn from the surface of the second end 110*b*, i.e., the unlocking portion 141*b* may have completely retracted the locking portion 141*a* from contact with the second end surface 111'. When the unlocking portion 141*b* reaches the transition side 123', the pin assembly moves along the "S" shape to a greater height along the clearance surface 121*d* of the arcuate portion 121 and the unlocking portion 141*a* and the locking portion 141*b* rise to a level above that of the first and second locking grooves 113, 114 taking the locking pin assembly 140 and the third bracket 130 along with them.

As illustrated, as the door 102 nears or reaches the closed position, the unlocking portion 141*b* may fall to the level of the second clearing surface 125 of the slot 122, under the weight $W_D$ of the door 102. Once the unlocking portion 141*b* enters the slot 122, the biased spring 143 may then return the pin assembly 140 to the locking mode, i.e., withdraw the unlocking portion 141*b* and extend the locking portion 141*a* for contact with the third resting surface 115*b* or the step surface 115*c* and, ultimately, contact with the third ramp surface 115*c*' on the second end surface 111" of the first bracket 110 when the door 102, once again, begins to open. The slot 122 is sufficiently large to allow the unlocking portion 141*b* to pass through it. Finally, as the door 102 is rotated in the first direction, the locking portion 141*a*, once again, contacts the third and first ramp surfaces 115*c*, 113*c* and the corresponding first and second locking grooves 113, 114. Note: In this exemplary embodiment, the door 102 may be closed from any lock position by physically lifting the door 102 high enough for the locking portion 141*a* to clear locking grooves 113, 114 and simultaneously rotating the door 102 in the second direction.

Figure 11:
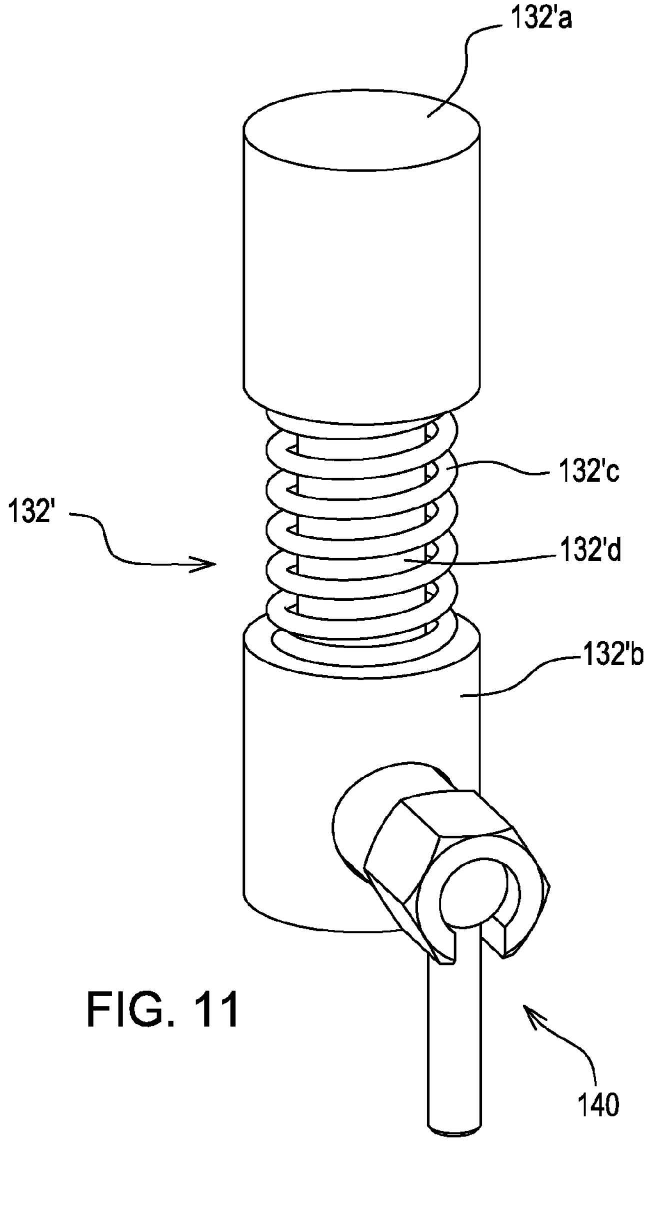
FIG. 11 is a perspective view of an alternative embodiment of the unlocking hinge.

FIG. 11 illustrates an alternative exemplary embodiment of the invention for use on a door 102 opening in a vertical direction. As illustrated, this embodiment of the invention includes a two part cylindrical portion 132' including first cylindrical portion 132'*a* which may be rigidly attached to the door 102 and second cylindrical portion 132'*b* which may be constrained to rotate with the first cylindrical portion via the shape of a connecting rod 132'*c*, e.g. a connecting rod 132'*c* with a non-circular cross section such as a square or rectangular cross section, yet have limited translational freedom of movement, for an adjustable translational distance from the first cylindrical portion 132'*a* and a mechanism such as, for example, locking spring 132'*d* biasing the second cylindrical portion 132'*b* away from the first cylindrical portion 132'*a*. In this exemplary embodiment, the locking spring 132'*d* may act as a substitute for the weight of the door 102 in holding the locking portion 141*a* in each of the locking grooves 113, 114 with sufficient force to keep the door 102 from rotating unless something external acts with sufficient force to rotate the door 102. The strength of the locking spring 132'*d* may be adjusted to the level desired for resistance of rotational door movement. With the exception of the locking spring 132'*d*, the alternative self locking hinge 100' would operate in a manner identical to the self locking hinge 100. Note: In this exemplary embodiment, the door 102 may be closed from any lock position by physically pushing the door 102 against the locking spring 132'*d* far enough for the locking portion 141*a* to clear locking grooves 113, 114 and simultaneously rotating the door 102 in the second direction.

Having described the preferred embodiment, it will become apparent that various modifications can be made without departing from the scope of the invention as defined in the accompanying claims.

The invention claimed is:

1. A hinge arrangement comprising:

a vehicle frame;

a door;

a first bracket rigidly attached to the vehicle frame, the first bracket comprising a locking area;

a second bracket rigidly attached to the vehicle frame, the second bracket comprising an unlocking area;

a third bracket rigidly attached to the door; and a pin assembly attached to the third bracket, the pin assembly comprising a locking portion and an unlocking portion, the locking portion configured to contact the locking area as the door is rotated in a first direction, the locking area configured to hold the door in place when the locking portion contacts the locking area, the unlocking portion configured to contact the unlocking area as the door continues to be rotated in the first direction, the unlocking area configured to withdraw the locking portion as the door is rotated in a second direction and when the unlocking area is in contact with the unlocking portion.

2. A hinge arrangement comprising:

a frame;

a door;

a first bracket having a locking area fixedly located with respect to the frame;

a second bracket fixedly located with respect to the frame and having an unlocking area;

a pin assembly fixedly located with respect to the door, the pin assembly having a locking portion and an unlocking portion, the pin assembly contacting the locking area and locking the door in place when the door is rotating in a first direction when it contacts the locking area, the unlocking portion and the unlocking area arranged to remove the locking portion as the door rotates in a second direction.

3. A hinge comprising:

a frame;

a door;

a bracket fixedly located with respect to the frame; and a pin assembly fixedly located with respect to the door, the pin assembly having a locking portion and an unlocking portion, the pin assembly contacting the locking area and locking the door in place when the door is rotating in a first direction when the locking portion contacts the locking area, the unlocking portion arranged to remove the locking portion as the door rotates in a second direction.

4. The hinge arrangement of claim 1, wherein the pin assembly is configured to bias the locking portion toward the locking area as the door is rotated in the first direction.

5. The hinge arrangement of claim 4, wherein the pin assembly comprises a spring and the spring is configured to bias the locking portion toward the locking area as the door is rotated in the first direction.

6. The hinge arrangement of claim 1, wherein the locking area is a first locking area, the first bracket comprises a second locking area, the locking portion is configured to contact the second locking area as the door is rotated in a first direction, the first locking area is configured to hold the door in a first position when the locking portion contacts the first locking area, the second locking area is configured to hold the door in a second position when the locking portion contacts the second locking area, and the unlocking portion is configured to contact the unlocking area after the door is rotated in the first direction beyond the first position and the second position.

7. The hinge arrangement of claim 1, wherein the locking area comprises a groove, the groove comprises a blocking surface on one end of the groove and a ramping surface on the opposite end of the groove, the blocking surface is configured to prevent the exit of the locking portion from the groove when the door is rotated opposite the first direction, and the ramping surface is configured to allow the exit of the locking portion from the groove when the door is rotated in the first direction.

8. The hinge arrangement of claim 7, wherein a first angle between an average slope of the blocking surface and a plane of rotation for the door is less than a second angle between an average slope of the ramping surface and the plane of rotation for the door.

9. The hinge arrangement of claim 8, wherein the second angle is obtuse.

10. The hinge arrangement of claim 8, wherein the first angle is either acute or right.

11. The hinge arrangement of claim 8, wherein the bottom of the groove is lower than the top of the groove such that the weight of the door exerts a force on the locking portion in the direction of the bottom of the groove.

12. The hinge arrangement of claim 11, wherein the pin assembly comprises a spring and the spring is configured to bias the locking portion toward the locking area as the door is rotated in the first direction.

* * * * *